United States Patent [19]

Narushima et al.

[11] 4,388,830
[45] Jun. 21, 1983

[54] METHOD AND APPARATUS FOR MEASUREMENT OF THICKNESS UTILIZING ULTRASONIC PULSES

[75] Inventors: Isao Narushima, Machida; Morio Nakano, Sagamihara, both of Japan

[73] Assignee: Teitsu Denshi Kenkyusho Co., Ltd., Kawasaki, Japan

[21] Appl. No.: 274,451

[22] Filed: Jun. 17, 1981

[30] Foreign Application Priority Data

Dec. 8, 1980 [JP] Japan ................. 55-172076

[51] Int. Cl.³ ............... G01N 29/00; G01N 24/00; G01H 5/00
[52] U.S. Cl. ...................... 73/597; 73/616; 73/620
[58] Field of Search ............... 73/597, 627, 628, 620, 73/610, 616

[56] References Cited

U.S. PATENT DOCUMENTS

| | | | |
|---|---|---|---|
| 3,812,709 | 5/1974 | Benson et al. ................. | 73/597 |
| 3,994,154 | 11/1976 | Niklas et al. .................. | 73/597 |
| 4,003,244 | 1/1977 | O'Brien et al. ............... | 73/597 X |
| 4,098,131 | 7/1978 | Renzel .......................... | 73/627 |
| 4,114,455 | 9/1978 | Walker ......................... | 73/597 |

FOREIGN PATENT DOCUMENTS 52-132864 4/1977 Japan.
822013 4/1981 U.S.S.R. ................. 73/597

*Primary Examiner*—Anthony V. Ciariante
*Assistant Examiner*—David V. Carlson
*Attorney, Agent, or Firm*—Fleit, Jacobson & Cohn

[57] ABSTRACT

Method and apparatus are disclosed for measuring the thickness of a workpiece by periodically transmitting ultrasonic pulses into the workpiece, receiving ultrasonic echo pulses reflected from the bottom surface of the workpiece, measuring the period of time elapsed from the time of transmission of each ultrasonic pulse to the time of reception of its related echo pulse by counting the number of clock pulses within the time period, counting each of such measured time periods by clock pulses, and deriving from each of such counted time periods and number of clock pulses within the time periods values a signal representing the thickness of the workpiece, wherein the measurement of the elapsed time period is effected with respect to a plurality of successive echo pulses, during which the phase of the clock pulses is caused to be shifted by a predetermined amount of $2\pi/N$ where N is an integer not less than 2 in a preselected direction upon completion of each measurement of the elapsed time period in such a manner that the resolution or accuracy in the thickness value finally obtained is improved.

11 Claims, 5 Drawing Figures

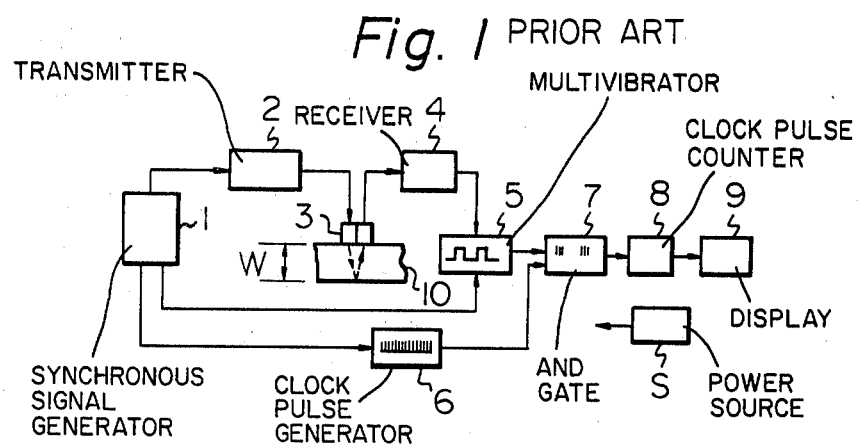
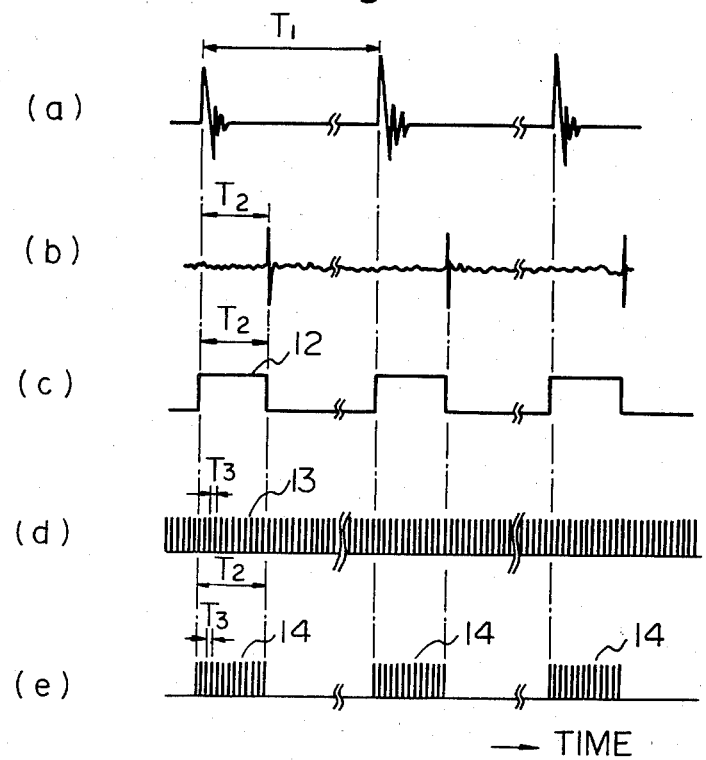

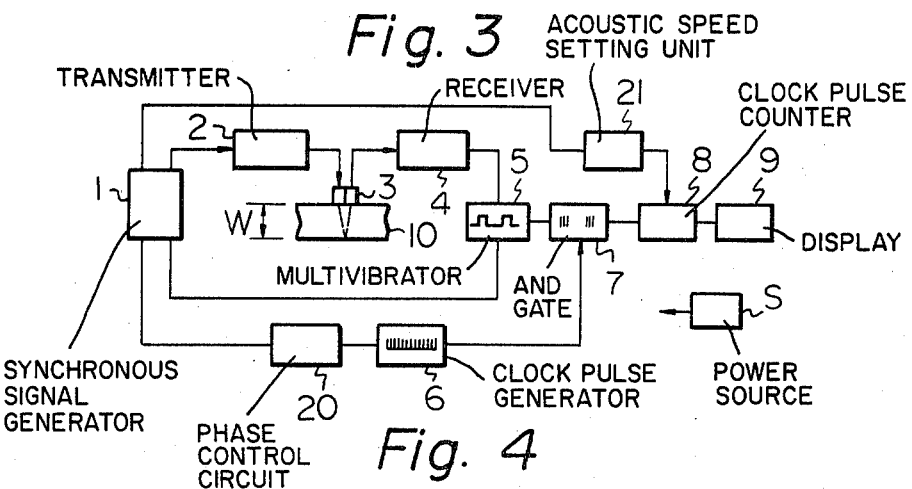
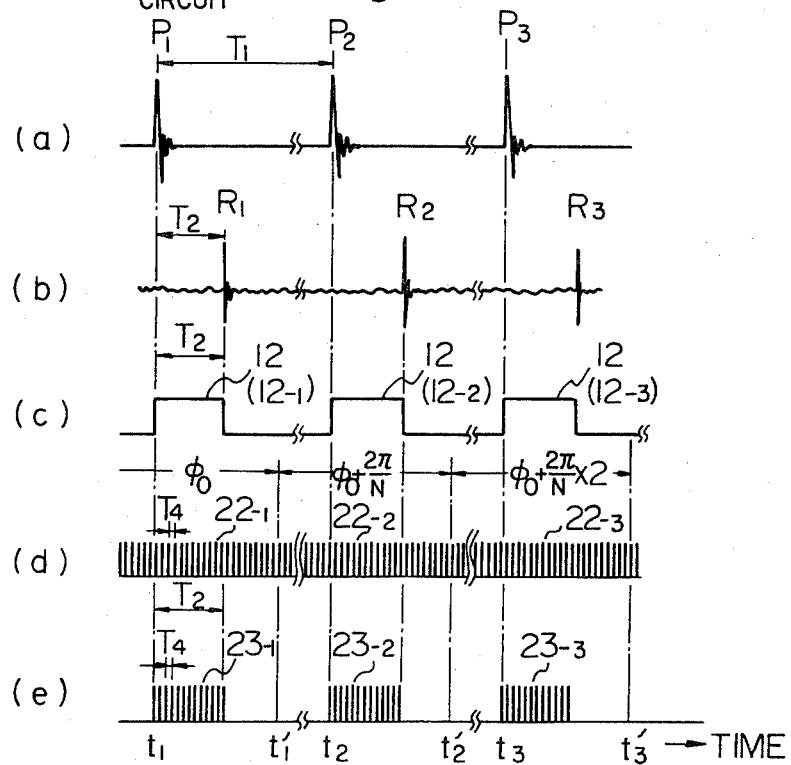

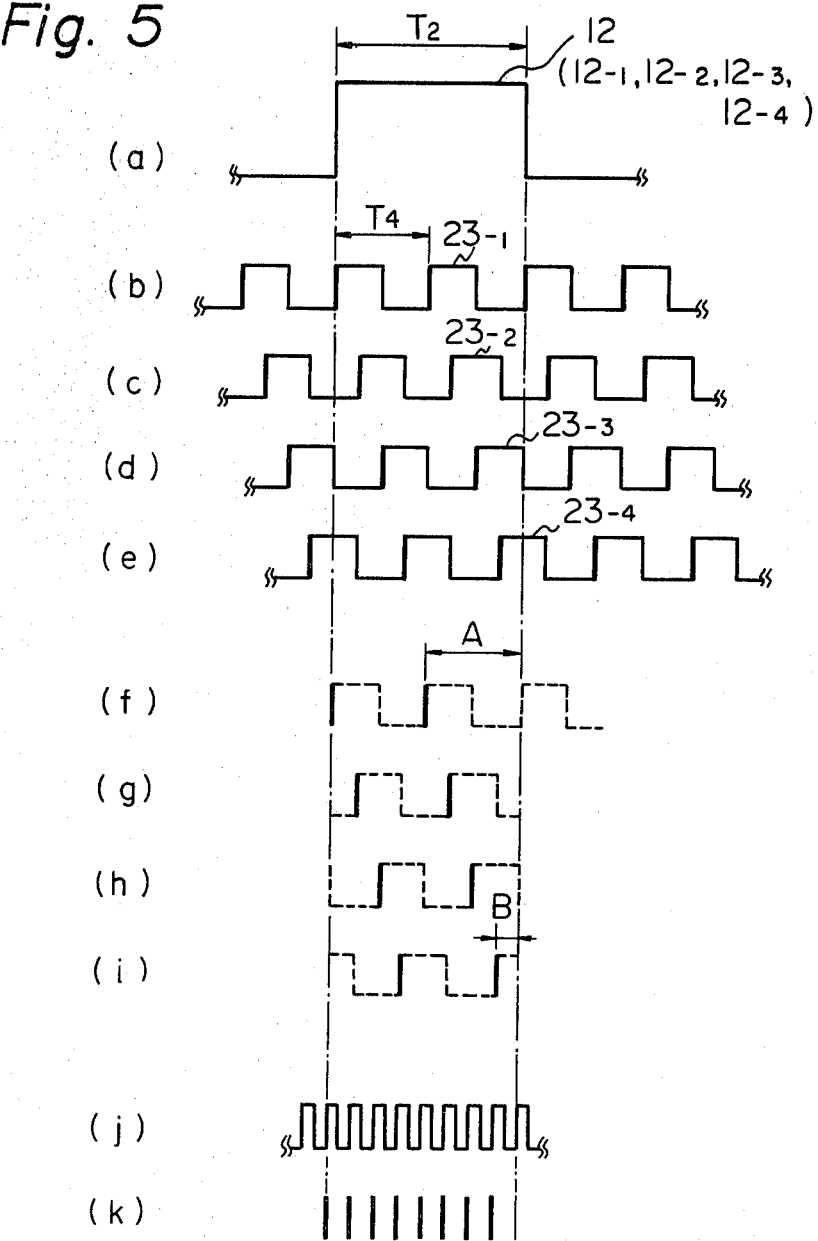

METHOD AND APPARATUS FOR MEASUREMENT OF THICKNESS UTILIZING ULTRASONIC PULSES

BACKGROUND OF THE INVENTION

This invention relates to a method and apparatus for measuring the thickness of a workpiece by the utilization of ultrasonic pulses in which ultrasonic pulses are periodically transmitted into the workpiece from one surface thereof so that ultrasonic echo pulses reflected from the bottom surface of the workpiece are received, and in which the period of time elapsed from the time of transmission of each ultrasonic pulse to the time of reception of its related echo pulse is measured to determine the thickness of the workpiece.

In carrying out the above method, the measurement of the elapsed time period is generally performed by counting the elapsed time period by clock pulses, and, therefore, the resolution or accuracy in the thickness value finally obtained depends on the frequency or period of the clock pulses.

Recently, user's requirements for improved resolution of ultrasonic thickness measuring apparatus have become severe, say, the resolution of 0.1 mm or less is required under the condition that the sound velocity within a workpiece is about 10,000 m/sec or more. In the case where the sound velocity is set at 10,000 m/sec and the resolution of 0.1 mm is required, it is necessary to use clock pulses having the period of $2 \times 10^{-8}$ sec (20 nano-seconds), that is, clock pulses having the frequency of as high as 50 MHz.

However, at present, a semiconductor IC oscillator having such a high upper frequency limit as 50 MHz is very expensive and involves consumption of a large amount of electric power. Thus, the known ultrasonic thickness measuring method and apparatus have the defect that they not only require high expenditure but also involve consumption of a large amount of electric power.

SUMMARY OF THE INVENTION

With this background of the invention in mind, it is an object of this invention to provide a method and apparatus for measuring the thickness of a workpiece which neither requires high expenditure nor involves consumption of a large amount of electric power.

This and other objects of the invention are attained generally by effecting, with respect to N succesive echo pulses (N is an integer not less than two), the measurement of the period of time elapsed from the time of transmission of each ultrasonic pulse to the time of reception of its related echo pulse while shifting the phase of clock pulses used to count the measured values of elapsed time period by $2\pi/N$ radians in a preselected direction each time the measurement of the elapsed time period is completed.

In an embodiment described later in conjunction with the drawings, N is selected to be four, so that the measurement of the elapsed time period is effected with respect to four successive echo pulses during which the phase of the clock pulses is shifted by $2\pi/4$ radians in a forward direction upon completion of each measurement of the elapsed time period.

BRIEF DESCRIPTION OF THE DRAWINGS

For a more complete understanding of the invention, reference is now made to the following Figures wherein:

FIG. 1 is a block diagram of a typical one of the conventional ultrasonic thickness measuring apparatuses, FIGS. 2(a)–(e) are time charts showing waveforms appearing at various points in FIG. 1, FIG. 3 is a block diagram of an ultrasonic thickness measuring apparatus according to the invention, FIGS. 4(a)–(e) are time charts showing waveforms appearing at various points in FIGS. 3, and FIGS. 5(a)–(k) are time charts illustrating the principle of operation in accordance with the invention and the effect produced thereby.

DETAILED DESCRIPTION OF THE PREFERRED EMBODIMENT

Before proceeding to the description of the invention, an example of ultrasonic thickness measuring apparatus according to a prior art will be described by reference to FIG. 1 and FIGS. 2(a)–(e).

In FIG. 1, the conventional ultrasonic thickness measuring apparatus comprises a synchronizing signal generator 1, a pulse transmitter 2 controlled by the generator 1 for generating electric pulses at a predetermined period $T_1$, a probe 3 for converting each of the electric pulses applied thereto from the transmitter 2 into an ultrasonic pulse to be transmitted into a workpiece 10 of a thickness W and for receiving each of the echo pulses reflected from the bottom surface of the workpiece 10 to convert it into a voltage pulse, an amplifier 4 for amplifying the voltage pulse, a multivibrator 5 responsive to the pulse from the synchronizing signal generator 1 and the amplified voltage pulse from the amplifier 4 for producing an electric pulse having a duration equal to the period of time $T_2$ elapsed from the time of transmission of an ultrasonic pulse to the time of reception to its related echo pulse, a clock pulse generator 6 for generating clock pulses having a period $T_3$, an AND gate circuit 7 enabled by the electric pulse from the multivibrator 5 for passing the clock pulses from the generator 6 for only its enabled period, a counting and arithmetic processing circuit 8 for counting the number of the clock pulses passed through the AND gate circuit 7 and operating on the counted value by the propagation speed of the ultrasonic pulses in the workpiece (it is provided with speed setting means, though this is not shown in FIG. 1) to derive a signal representing the thickness of the workpiece 10, a display 9 for displaying the signal from the circuit 8, and a power source S for supplying the respective components with necessary electric power. The display 9 may be a digital display.

In operation of the apparatus of FIG. 1, the probe 3 is caused to contact the upper surface of the workpiece 10 and the electric pulses having a period $T_1$ from the transmitter 2 are applied to the probe 3. In response to the electric pulses, the probe 3 produces such ultrasonic pulses as are shown in FIG. 2(a) and transmits these pulses into the workpiece 10. Each of the ultrasonic pulses transmitted into the workpiece 10 is reflected at the bottom surface thereof and reaches the probe 3 with the delay time $T_2$ as measured from the time of its transmission into the workpiece 10. Thus, ultrasonic echo pulses having a waveform as shown in FIG. 2(b) are received by the probe 3 and converted thereby into corresponding voltage pulses. The voltage pulses are amplified by the amplifier 4. The delay time $T_2$ can be expressed as $T_2=2W/C$ where W represents the thickness of the workpiece and C represents the propagation speed of the ultrasonic pulses in the workpiece. The multivibrator 5 is turned on in response to each of the synchronizing signals from the generator 1 and turned off in response to each of the received echo pulses, thereby producing a thickness pulse voltage 12 of a duration corresponding to the delay time $T_2$ of the echo pulse as shown in FIG. 2(c). The thickness pulse voltage 12 is applied to the AND gate circuit 7. On the other hand, clock pulses 13 having a period $T_3$ as shown in FIG. 2(d), which are generated by a crystal oscillator within the clock pulse generator 6, are applied to the AND gate circuit 7. The AND gate circuit 7 is enabled by the thickness pulse voltages 12 to thereby allow a train of clock pulses 14 as shown in FIG. 2(e) to pass through the AND gate circuit 7 for application to the counting and arithmetic processing circuit 8. The counting and arithmetic processing circuit 8 counts the number of the clock pulses in the pulse train 14 sent thereto from the AND gate circuit 7.

When the number of clock pulses included in the pulse train 14 is n, then, based on the relationship $T_2=2W/C=T_3\times n$, the thickness W can be expressed as follows:

$$W=C\times T_3\times n/2$$

The thickness value thus derived is displayed on the display 9.

In passing, in an actual apparatus, it is usual that a so-called zero-point adjusting circuit is connected between the synchronizing signal generator 1 and the multivibrator 5. However, in the above description of the conventional apparatus, such circuit has been omitted, because a knowledge of such circuit is neither important for the description of the principle of operation of the conventional apparatus nor necessary for the understanding of this invention.

As seen from the above expression concerning the thickness W, the resolution or accuracy in the thickness value obtained depends on the period $T_3$ of the clock pulses and hence on the frequency of the clock pulses.

However, as previously mentioned, prior art method and apparatus of this kind have the defect that they not only require high expenditure but also consume a large amount of electric power.

Next, this invention will be described by reference to FIGS. 3, FIGS. 4(a)–(e) and FIGS. 5(a)–(k).

The circuit of FIG. 3 has substantially the same configuration as that of FIG. 1 except that it comprises a phase control circuit 20 in addition to the components employed in the circuit of FIG. 1 and in that a sound speed setting means used with the counting and arithmetic processing circuit 8 is shown and indicated by reference numeral 21. Accordingly, the same reference numerals are used in FIG. 3 for respectively designating the same components as those in FIG. 1.

FIG. 4(a) shows ultrasonic pulses $P_1, P_2, \ldots$ successively transmitted into the workpiece 10 with a period $T_1$ while FIG. 4(b) shows corresponding ultrasonic echo pulses $R_1, R_2, \ldots$ reflected from the bottom surface of the workpiece 10. FIG. 4(c) shows pulses 12 of a duration equal to the delay time $T_2$ produced at the output of the thickness multivibrator 5, which will be individually designated by reference numerals 12-1, 12-2, ... in the description made hereunder, as required.

The operation of the apparatus of FIG. 3 for deriving pulses 12-1, 12-2, ... is similar to the operation of the apparatus of FIG. 1 for deriving the thickness pulse voltages 12. However, the apparatus of FIG. 3 operates in a different way from the apparatus of FIG. 1 in counting the thickness pulses by clock pulses, as described hereunder.

The clock pulse generator 6 includes a crystal oscillator which generates clock pulses with a period $T_4$ under the control of the synchronizing signal generator 1, but the phase of the clock pulses is shifted by $2\pi/N$ radians (N is an integer not less than two) in a preselected direction each time the measurement of the delay time or elapsed time period $T_2$ is completed. Let us assume that the ultrasonic pulses $P_1, P_2, \ldots$ are transmitted into the workpiece 10 at time points $t_1, t_2, \ldots$, respectively. Then, the phase of the clock pulses is advanced (or delayed) by $2\pi/N$ radians at each of the time points $t_1'$, $t_2', \ldots$ as shown in FIG. 4(e) under the control of the signal from the phase control circuit 20, wherein said time point $t_1'$ is selected to be at an appropriate point between $(t_1+T_2)$ and $t_2$, said time point $t_2'$ is selected to be at an appropriate point between $(t_2+T_2)$ and $t_3$, and so forth.

Thus, the generator 6 generates at its output clock pulses 22-1 having a phase $(\phi_0+2\pi/N)$ during the period from $t_1'$ to $t_2'$, clock pulses 22-3 having a phase $(\phi_0+(2\pi/N)\times 2)$ during the period from $t_2'$ to $t_3'$, etc. as shown in FIG. 4(d), which are applied to the AND gate circuit 7. The AND gate circuit 7 is also supplied with the pulse voltage 12 from the thickness multivibrator 5. The AND gate circuit 7 produces the clock pulse trains 23-1, 23-2, ... which are phase-shifted by $2\pi/N$ radians to one another, as shown in FIG. 4(e). The clock pulse trains 23-1, 23-2, ... are applied to the counting and arithmetic processing circuit 8 where the number of the clock pulses included in each of N successive trains 23-1 through 23-N is counted and the number of time periods N is counted. Thus, in effect, the measurement of the delay time or elapsed time period is effected with respect to N successive echo pulses. On the other hand, a factor relating to the propagation speed of the ultrasonic pulses in the workpiece 10 is applied from the setting means 21 to the counting and arithmetic processing circuit 8, so that the circuit 8 operates on the counted value by the factor to derive a signal representing the thickness of the workpiece. The thickness value thus derived is displayed on the display 9 which is preferably a digital display. Here the clock pulse train 23-1 having a phase $\phi_0$ shown in FIG. 4(e) corresponds to the clock pulse train 14 shown in FIG. 2(e).

The function of the apparatus of FIG. 3 and the effect produced thereby will now be described by reference to FIGS. 5(a)–(k).

For the convenience of description, it is assumed in FIGS. 5(a)–(k) that N is selected to be four, $\phi_0$ is selected to be zero, the clock pulses are selected to have a period $T_4$, and the thickness pulse voltage 12 is selected to have a duration $T_2=2T_4$, which correspond to the case where the clock pulse trains 23-1, 23-2, 23-3, and 23-4 are phase-shifted by $2\pi/4$ radians (90°) to one another.

FIG. 5(a) shows only one thickness pulse voltage 12, for the sake of simplicity, on behalf of the thickness pulse voltages 12-1 through 12-4. FIGS. 5(b) through (e) show the clock pulse trains 23-1 through 23-4, respectively, while FIGS. 5(f) through (i) respectively illustrate the manner of counting the thickness pulse voltages 12-1 through 12-4 by the phase-shifted clock pulses with the assumption that the counting is effected at the leading edge of each clock pulse as indicated by thick solid lines.

The state of the clock pulses shown in FIG. 5(f) corresponds to that of the conventional case. In FIG. 5(f) the number of counts is two (2), but it is apparent from the drawing that the resolution attained in the case of FIG. 5(f) is $T_4$ corresponding to the time-length A of one cycle of the clock pulses, because the counting is effected by one cycle of the clock pulses. In each of FIGS. 5(g) through (i), the number of counts is two (2) as in the case of FIG. 5(f), but it is noted that, in the cases of FIGS. 5(g) through (i), the counting is effected at positions which are phase-shifted by 90° to one another in the order of FIG. 5(g), FIG. 5(h) and FIG. 5(i) and which are located between the leading edges of adjacent ones of the clock pulses of FIG. 5(f). Thus, if the counting is effected four times so that all the four counting operations illustrated in FIGS. 5(f) through (i) are performed, the total number is eight (8). It is apparent that the resolution attained in this case is $T_4/4$ which corresponds to the time-length B measured from the time point at which the value "two (2)" has been counted in FIG. 5(i) to the time point at which the next succeeding clock pulse starts in FIG. 5(f). That is, in this case the resolution is improved by four times in comparison to the case of FIG. 5(f) which corresponds to the conventional case. In other words, according to this embodiment, such resolution can be obtained which corresponds to that obtained in the case where the counting is made by clock pulses having a period $T_4/4$ (four times, from the viewpoint of the frequency) while not effecting the phase-shifting. FIG. 5(j) shows the clock pulses the period of which has been varied to be $T_4/4$ while FIG. 5(k) shows the manner in which the counting is effected by means of the clock pulses of FIG. 5(j).

The thickness value to be displayed on the display 9 can be derived by dividing the total number of counts "eight (8)" by "four (4)" which is the number of times in which the counting operations have been effected, such division being performed by the counting and arithmetic processing circuit 8.

From the analogy with respect to the above-mentioned specific case, it will be easily understood that, generally, in case the duration $T_2$ of the thickness pulse is measured by using clock pulses of a period $T_4$, the thickness W of the workpiece is expressed by $$W = C \times T_4 \times n/2$$

where n is the number of clock pulses counted and $T_4$ is the period of the clock pulses. In this case, the resolution in thickness measurement is $CT_4/2$ (This case corresponds to the conventional case.).

On the other hand, in case the duration $T_2$ of each of N successive thickness pulses is measured by using clock pulses of a period $NT_4$ under the condition that the phase of the clock pulses is shifted by $2\pi/N$ radians upon completion of measurement of each thickness pulse, the count number n is expressed as $n = T_2/NT_4 \times N = T_2/T_4$ and the thickness W of the workpiece is expressed as $W = C \times T_4 \times n/2$, with the result that the resolution in this case is $CT_4/2$. This means that the same degree of resolution as that of the conventional case can be obtained even if the frequency of the clock pulses is reduced to 1/N, if such phase-shifting as has been described above is effected.

In N' successive thickness pulses of a period $T_2$ are measured by clock pulses of a period $T_4$ under the condition that the phase of the clock pulses is shifted by $2\pi/N'$ radians upon completion of measurement of each thickness pulse, the resolution obtained is $CT_4/2N'$. This means that the resolution is improved N' times in comparison to that of the conventional case.

In the case where the counting operation is effected with respect to N successive thickness pulses 12, the thickness value to be displayed on the display 9 is derived by dividing the total number of counts obtained from such counting operations by the number of times N in which the counting operations have been effected, such division being performed by the counting and arithmetic processing circuit 8.

It can be said that the method described above functions as if the frequency of the clock pulses were increased to N times.

In the simplest example of the embodiments of the invention, the apparatus was constructed so that the clock pulses had the frequency of 25 MHz (because of IC oscillator providing such frequency was easily available at a relatively low cost) and the phase of the clock pulses was sequentially shifted by 180° to measure the delay time of two successive thickness pulses in such a way that the thickness of a workpiece presenting the sound propagation speed of 10,000 m/sec could be measured with the resolution of 0.1 mm. The apparatus so constructed was used to measure the thickness of a steel material presenting the sound propagation speed of 5950 m/sec during which the speed setting means 21 of the apparatus was set at the value of 5950 m/sec so as to multiply the counted value by 0.595 in the counting and arithmetic processing circuit 8, on one hand, and to measure the thickness of an aluminum material presenting the sound propagation speed of 6260 m/sec during which the speed setting apparatus 21 of the apparatus was set at the value of 6260 m/sec so as to multiply the counted value by 0.626 in the counting and arithmetic processing circuit 8, on the other hand. In both cases, the thickness value displayed on the display 9 could have effective digits to the first decimal place, that is, the displaying made with the resolution of 0.1 mm.

As another example, the apparatus was constructed so that the phase of the clock pulses was sequentially shifted by 18° to measure the delay time of ten succesive thickness pulses. In this case, the thickness value displayed on the display 9 could have effective digits to the second decimal place, that is, the displaying made with the resolution of 0.01 mm.

Thus, the invention can provide thickness measurement of high resolution which could be attained by the prior arts only when the frequency of the clock pulses was increased to N times, by measuring N successive thickness pulses by use of clock pulses whose phase is sequentially shifted by $2\pi/N$ radians while not increasing the frequency thereof. Further, this invention makes it possible to avoid use of an expensive IC oscillator having a high upper limit frequency thereby reducing the cost of the apparatus.

Although preferred embodiments have been described it is believed that numerous modifications and alterations thereto would be apparent to one having ordinary skill in the art without departing from the spirit and scope of the invention.

What is claimed is:

1. A method of measuring the thickness of a workpiece comprising the steps of periodically transmitting ultrasonic pulses into the workpiece, receiving echo pulses reflected from the bottom surface of the workpiece, measuring the period of time elapsed from the time of transmission of each ultrasonic pulse to the reception of its related echo pulse, counting each of such measured time periods, and deriving from each of such counted values and said measured time periods a signal representing the thickness of the workpiece, characterized in that the measurement of the elapsed time period is effected with respect to N successive echo pulses, during which the phase of the clock pulses is caused to be shifted by $2\pi/N$ radians where N is an integer not less than two in a preselected direction upon completion of each measurement of the elapsed time period, whereby the resolution in measuring the thickness of the workpiece is improved.

2. The method according to claim 1 characterized in that the phase of the clock pulses is caused to be advanced by $2\pi/N$ radians upon completion of each measurement of the elapsed time period.

3. The method according to claim 1 characterized in that the phase of the clock pulses is caused to be delayed by $2\pi/N$ radians upon completion of each measurement of the elapsed time period.

4. An apparatus for measuring the thickness of a workpiece comprising a probe for transmitting ultrasonic pulses into a workpiece and for receiving related ultrasonic echo pulses, a synchronizing signal generator, means responsive to said synchronizing signal generator for periodically supplying electric pulses to said probe to cause it to produce said ultrasonic pulses, means for measuring the period of time elapsed from the time of transmission of each ultrasonic pulse to the time to reception of its related echo pulse, a clock pulse generator, means for counting each of said measured time periods, means for counting the number of clock pulses within said measured time periods by the clock pulses supplied from said clock pulse generator, and means for deriving from each of such counted time periods and such counted clock pulses within said measured time periods a signal representing the thickness of the workpiece, characterized in that there is provided a phase control circuit between said synchronizing signal generator and said clock pulse generator, said phase control circuit being adapted to shift the phase of said clock pulses by $2\pi/N$ radians where N is an integer not less than two in a preselected direction upon completion of each measurement of the elapsed time period during which N successive echo pulses are measured by said measuring means.

5. The apparatus according to claim 4 characterized in that said phase control circuit is adapted to advance the phase of said clock pulses by $2\pi/N$ radians upon completion of each measurement of the elapsed time period.

6. The apparatus according to claim 4 characterized in that said phase control circuit is adapted to delay the phase of said clock pulses by $2\pi/N$ radians upon completion of each measurement of the elapsed time period.

7. The apparatus according to claim 4 characterized in that said measuring means comprises a multivibrator adapted to be turned on in response to a synchronizing signal from said synchronizing signal generator and turned off in response to an electric signal corresponding to an echo pulse received by said probe.

8. The apparatus according to claim 7 characterized in that said counting means comprises an AND gate circuit enabled by the output signal from said multivibrator to pass the clock pulses from said clock pulse generator for only its enabled period, so that the number of clock pulses thus passed is counted.

9. The apparatus according to claim 4 characterized in that said counting means is provided with an arithmetic processing circuit accompanied by sound speed setting means for deriving a signal representing the thickness of the workpiece.

10. The apparatus according to claim 9 characterized in that there is provided a display for displaying the derived thickness value.

11. The apparatus according to claim 10 characterized in that said display comprises a digital display.

* * * * *